(12) United States Patent
Parrish

(10) Patent No.: US 9,670,013 B2
(45) Date of Patent: Jun. 6, 2017

(54) RECREATIONAL VEHICLE LOADING AND CARRYING APPARATUS

(71) Applicant: Bryan Lee Parrish, Laurens, SC (US)

(72) Inventor: Bryan Lee Parrish, Laurens, SC (US)

( * ) Notice: Subject to any disclaimer, the term of this patent is extended or adjusted under 35 U.S.C. 154(b) by 0 days.

(21) Appl. No.: 14/944,580

(22) Filed: Nov. 18, 2015

(65) Prior Publication Data
US 2016/0137117 A1 May 19, 2016

Related U.S. Application Data

(60) Provisional application No. 62/081,105, filed on Nov. 18, 2014.

(51) Int. Cl.
| | | |
|---|---|---|
| *B65G 69/30* | (2006.01) | |
| *B60P 1/43* | (2006.01) | |
| *B60P 3/40* | (2006.01) | |
| *B60P 3/07* | (2006.01) | |

(52) U.S. Cl.
CPC .............. *B65G 69/30* (2013.01); *B60P 1/435* (2013.01); *B60P 3/40* (2013.01); *B60P 3/07* (2013.01)

(58) Field of Classification Search
CPC .. B65G 69/30; B60P 1/435; B60P 3/40; B60P 3/07
See application file for complete search history.

(56) References Cited

U.S. PATENT DOCUMENTS

| | | | | |
|---|---|---|---|---|
| 6,076,215 A | * | 6/2000 | Blankenship | B60P 1/43 14/69.5 |
| 6,250,874 B1 | * | 6/2001 | Cross | B60P 1/43 296/61 |
| 7,549,692 B2 | * | 6/2009 | Washington | B60P 1/435 296/61 |
| 9,085,258 B2 | * | 7/2015 | Patterson | B60P 1/435 |
| 9,108,687 B2 | * | 8/2015 | Lepage | B60P 3/40 |
| 2008/0159838 A1 | * | 7/2008 | Sherer | B60P 1/435 414/537 |
| 2008/0174138 A1 | * | 7/2008 | Huggins | B60P 1/435 296/61 |
| 2008/0231067 A1 | * | 9/2008 | Nagle | B60P 3/07 296/50 |
| 2012/0009050 A1 | * | 1/2012 | Pepin | B60P 1/435 414/537 |
| 2016/0129824 A1 | * | 5/2016 | Adriani | B60P 1/435 414/523 |
| 2016/0144758 A1 | * | 5/2016 | Knapp | B60P 1/435 414/537 |
| 2016/0144759 A1 | * | 5/2016 | DiBlasio | B60P 1/435 414/537 |

* cited by examiner

*Primary Examiner* — Kaitlin Joerger
(74) *Attorney, Agent, or Firm* — Southeast IP Group, LLC.; Thomas L. Moses

(57) ABSTRACT

An apparatus is provided to assist in the loading and carrying of recreational vehicles in a pick-up truck vehicle having a trailer hitch receiver. The apparatus includes a trailer hitch engaging member that partially inserts into the trailer hitch receiver and extends from the trailer hitch receiver. The apparatus also includes a platform member attached to the trailer hitch engaging member and at least one ramp member attached to the rear edge of the platform member. The ramp members may be folded and unfolded for loading and unloading and further include locking mechanisms for locking the ramps in place.

10 Claims, 17 Drawing Sheets

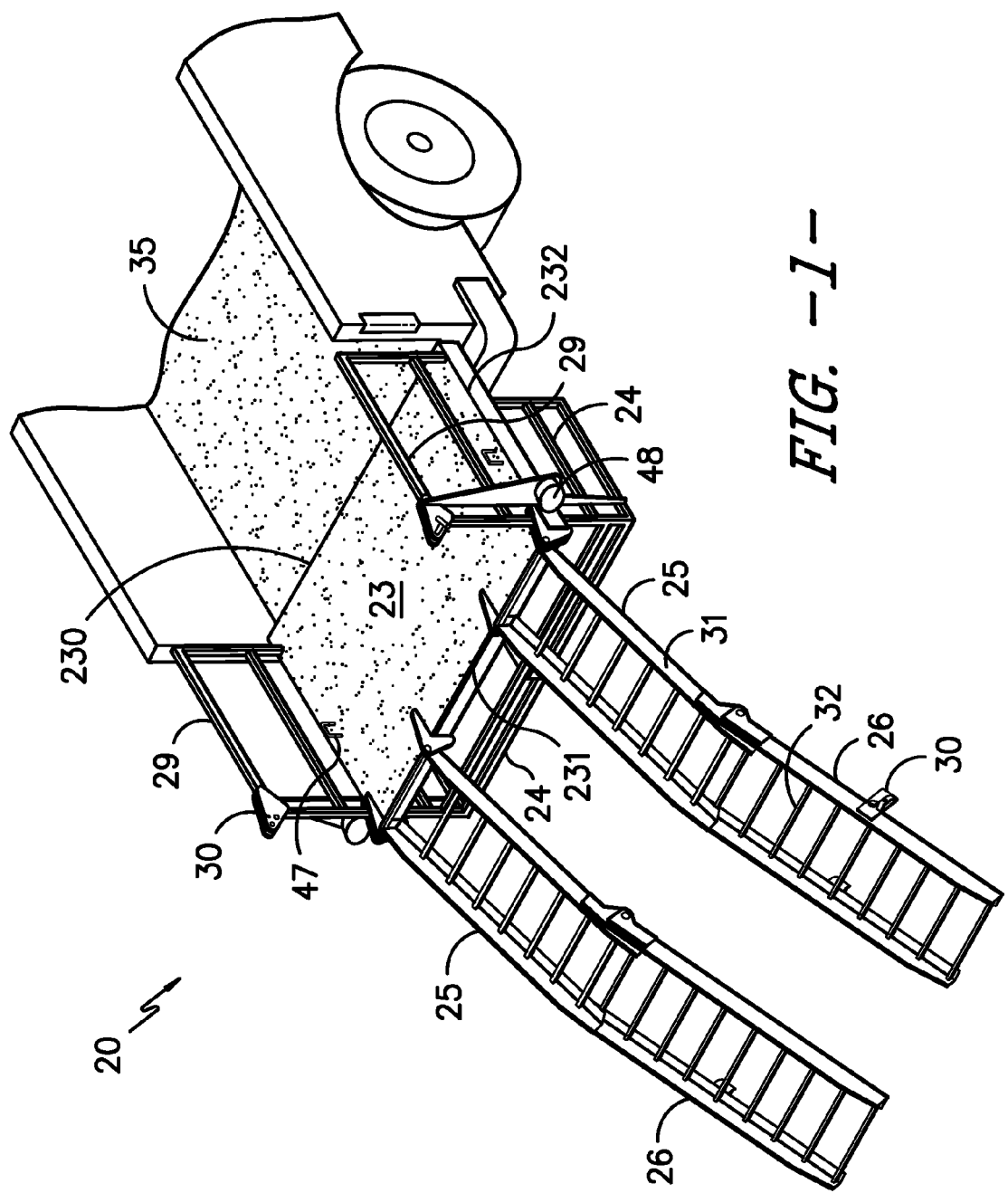
FIG. -1-

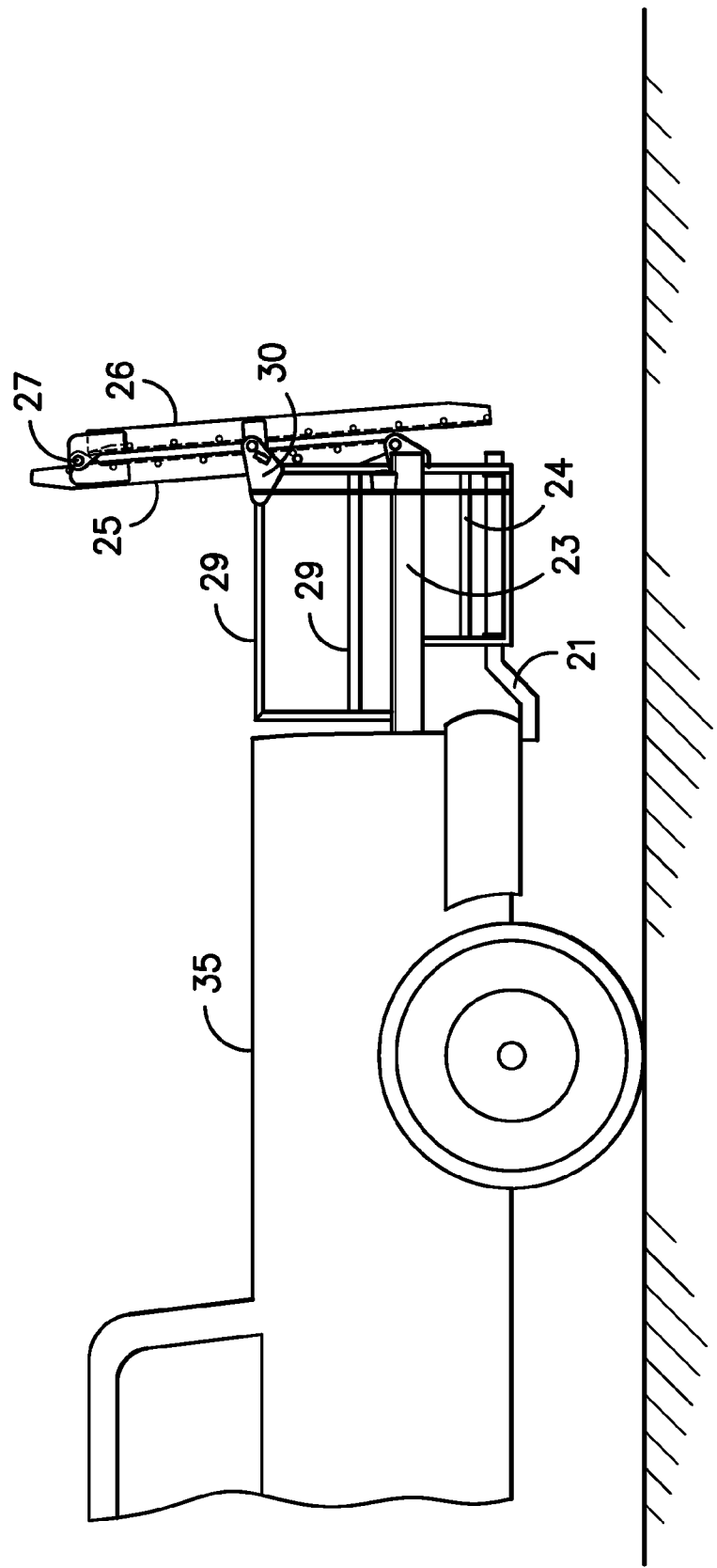
FIG. -2-

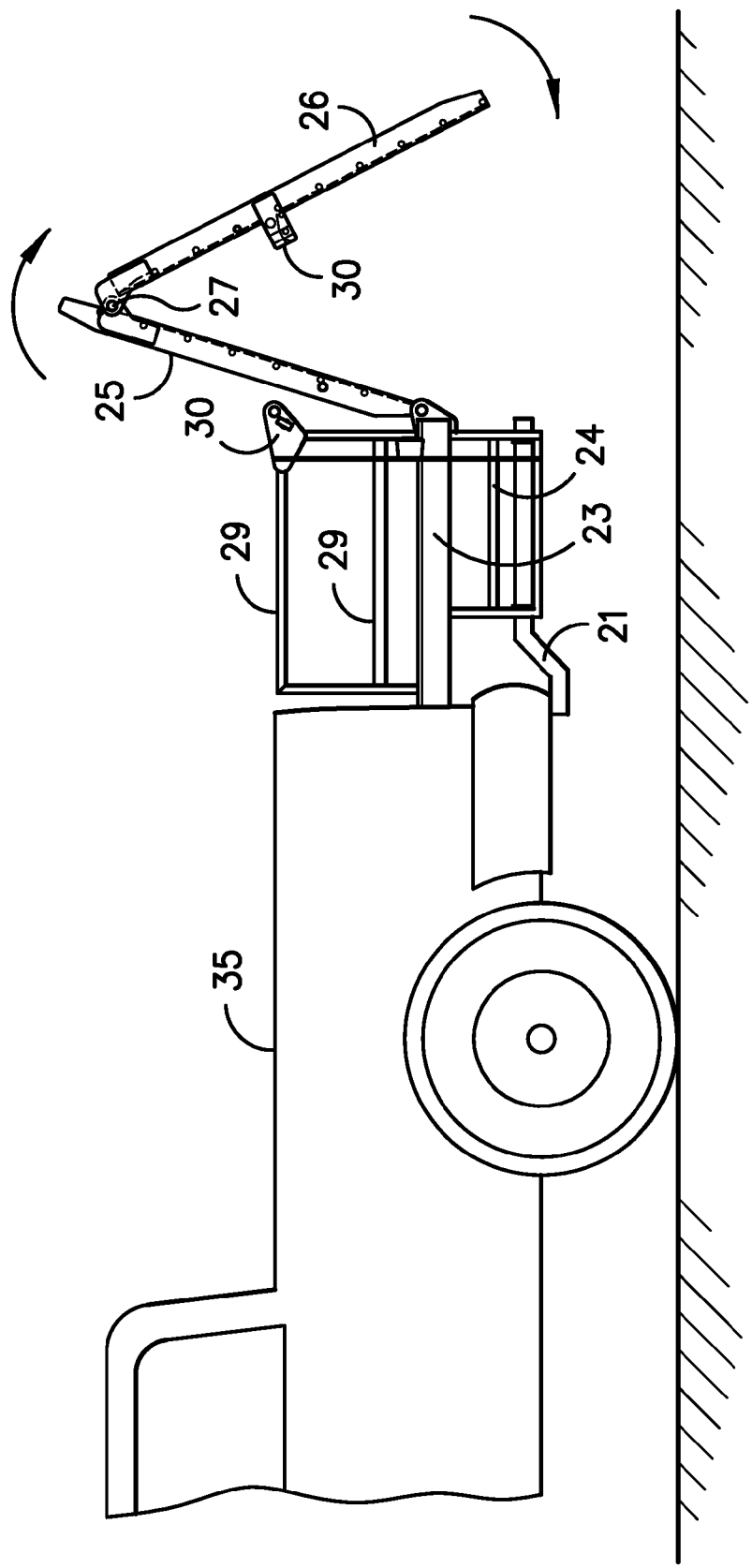
FIG. -3-

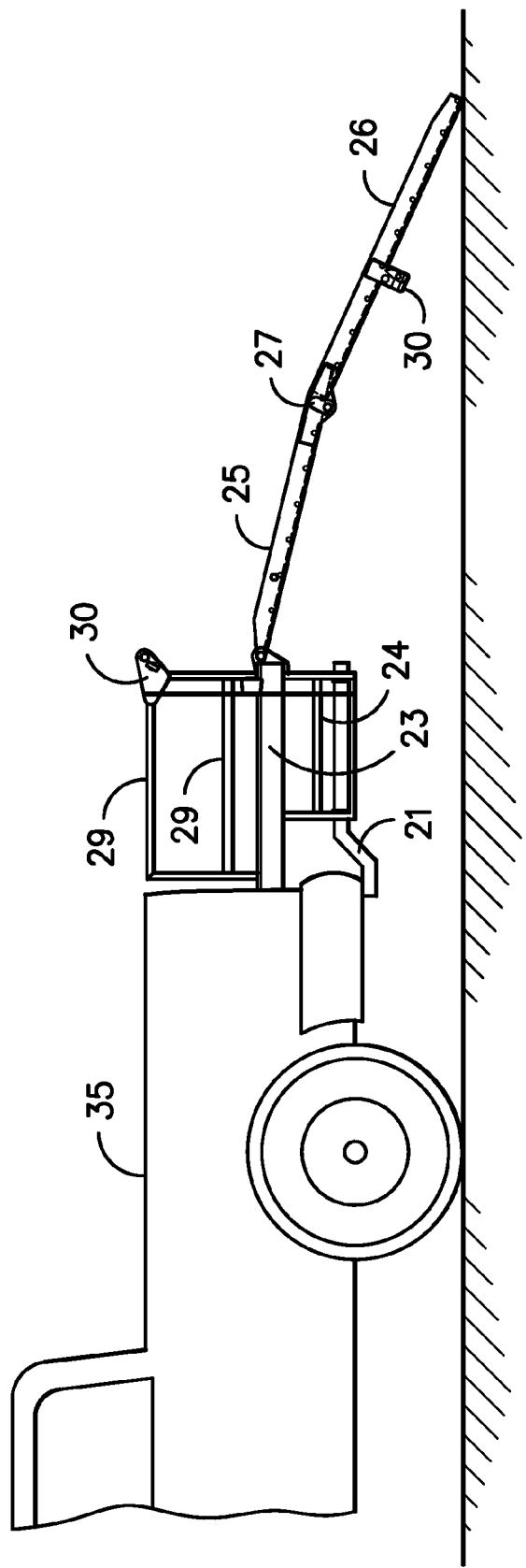
FIG. -4-

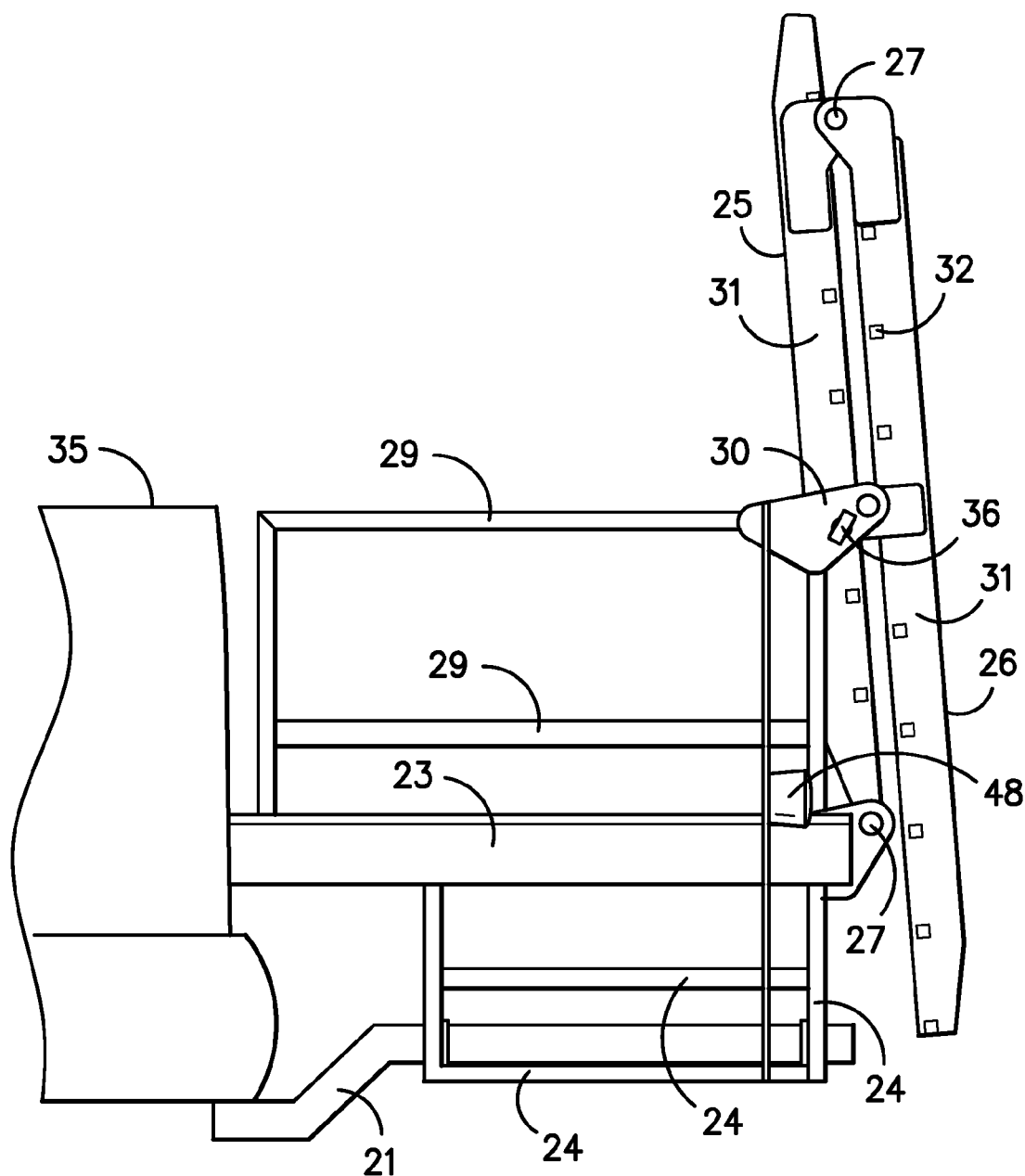
FIG. -5-

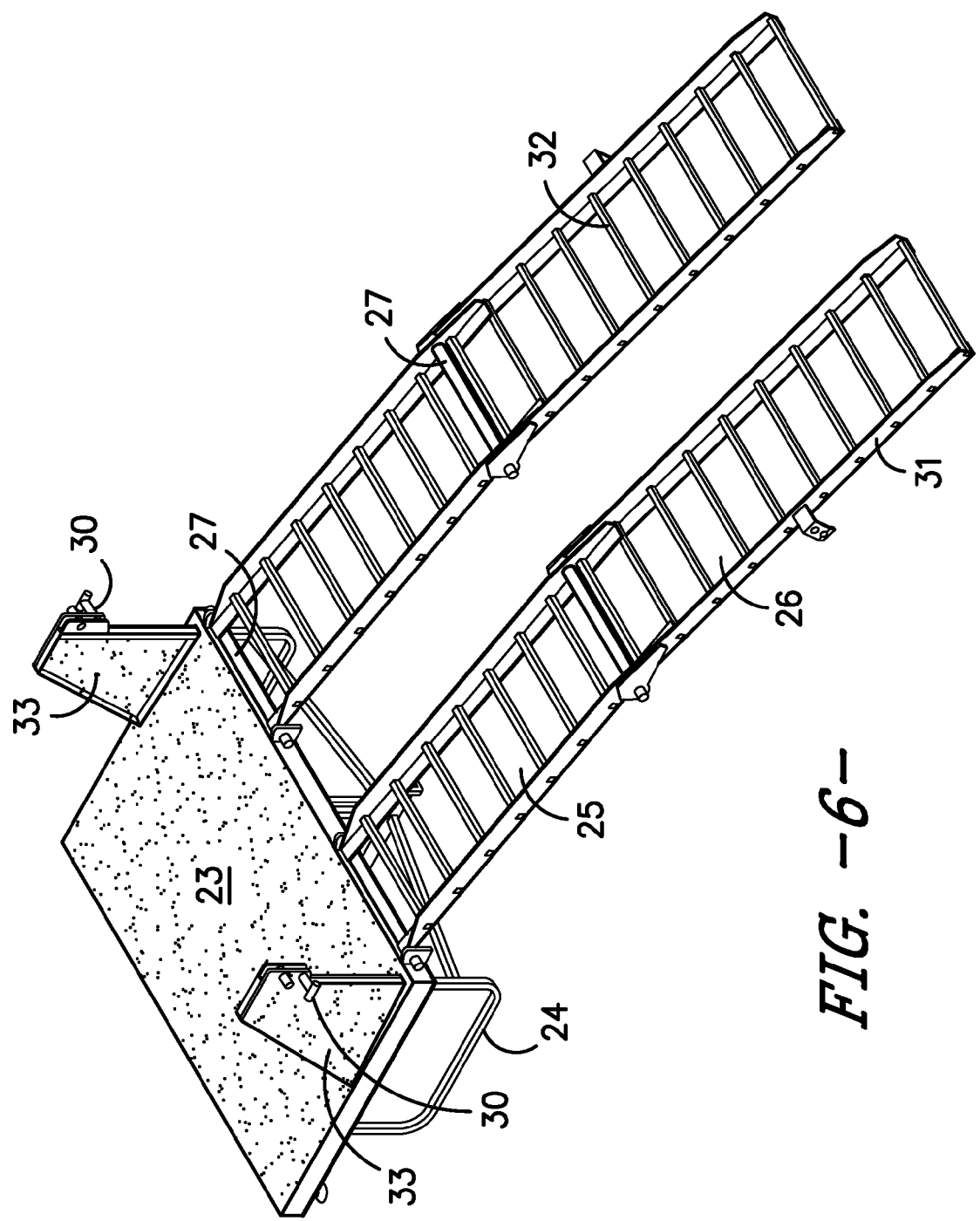
FIG. -6-

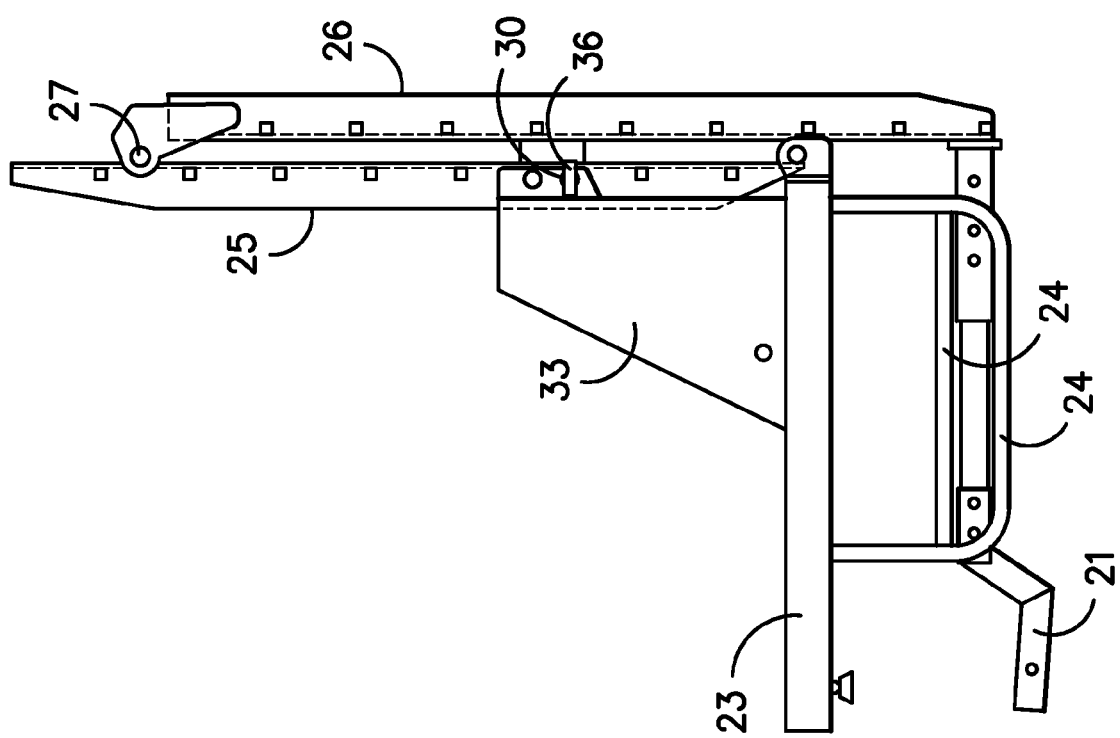

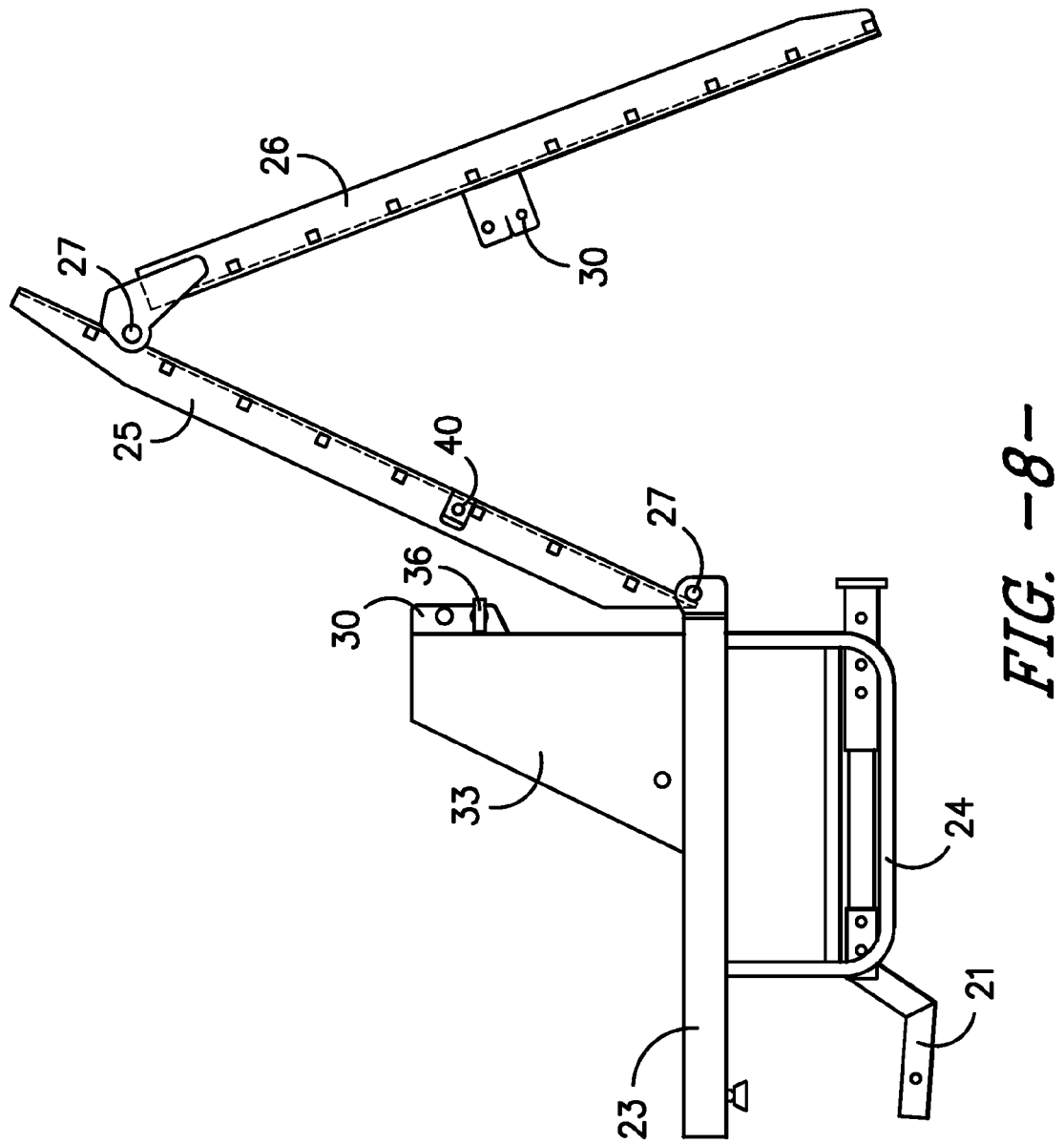
FIG. -8-

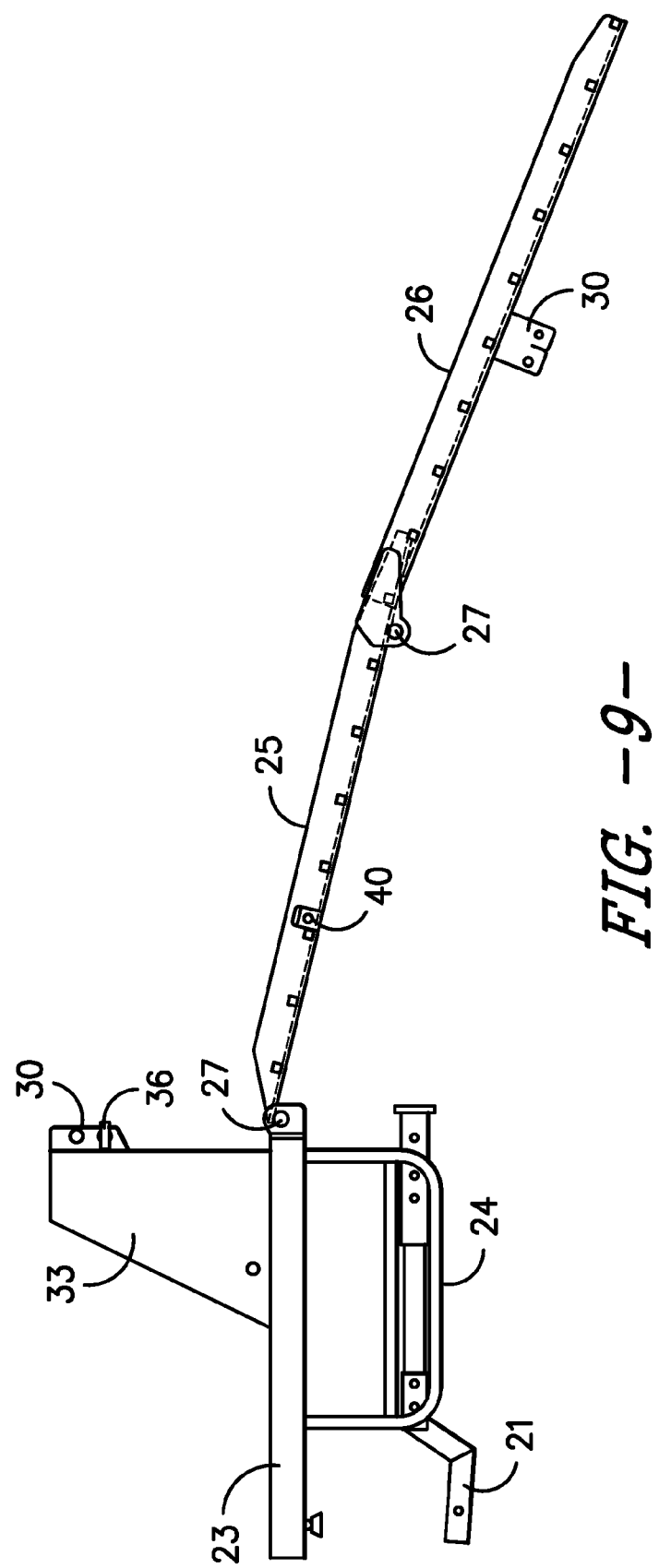
FIG. -9-

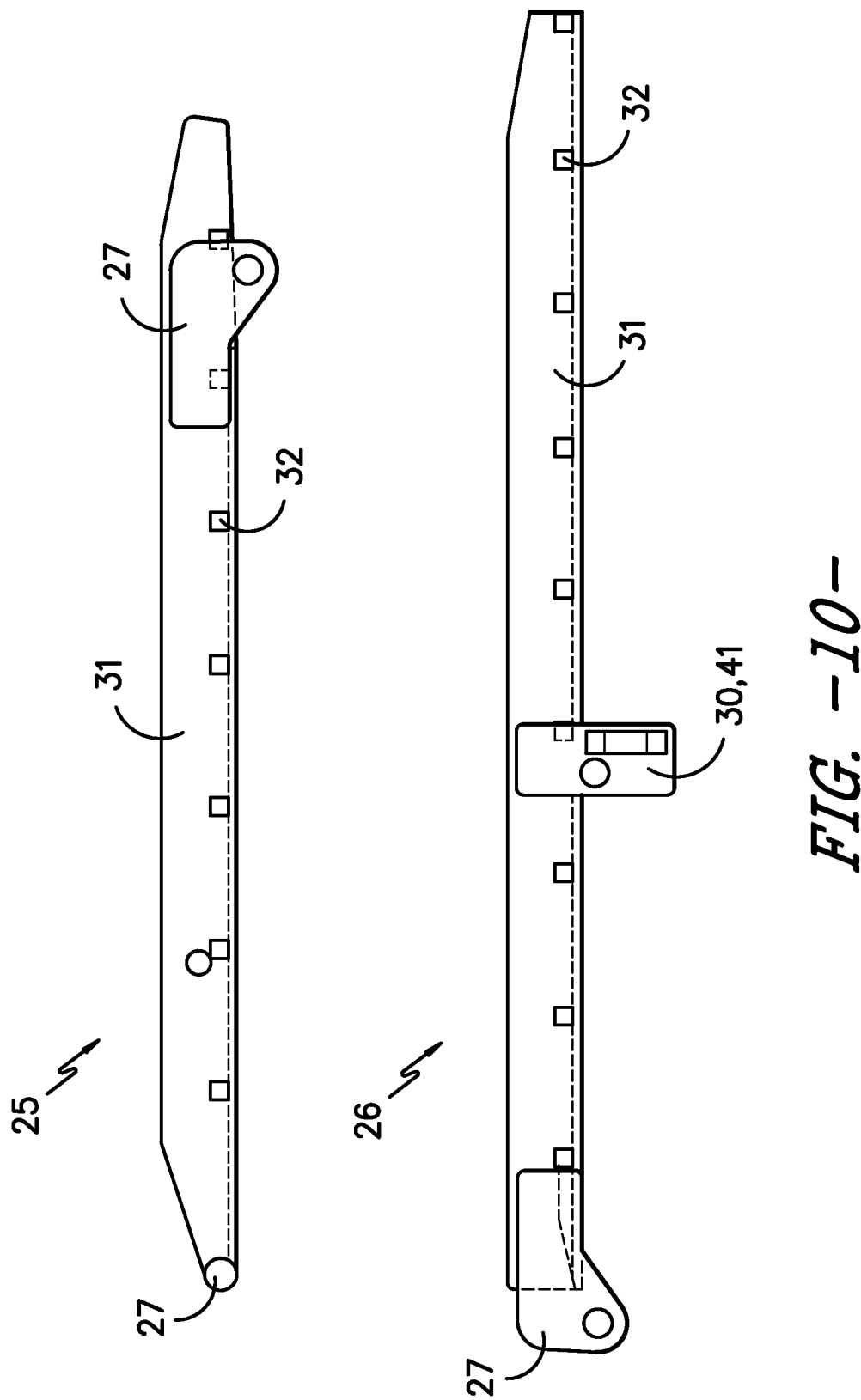
FIG. -10-

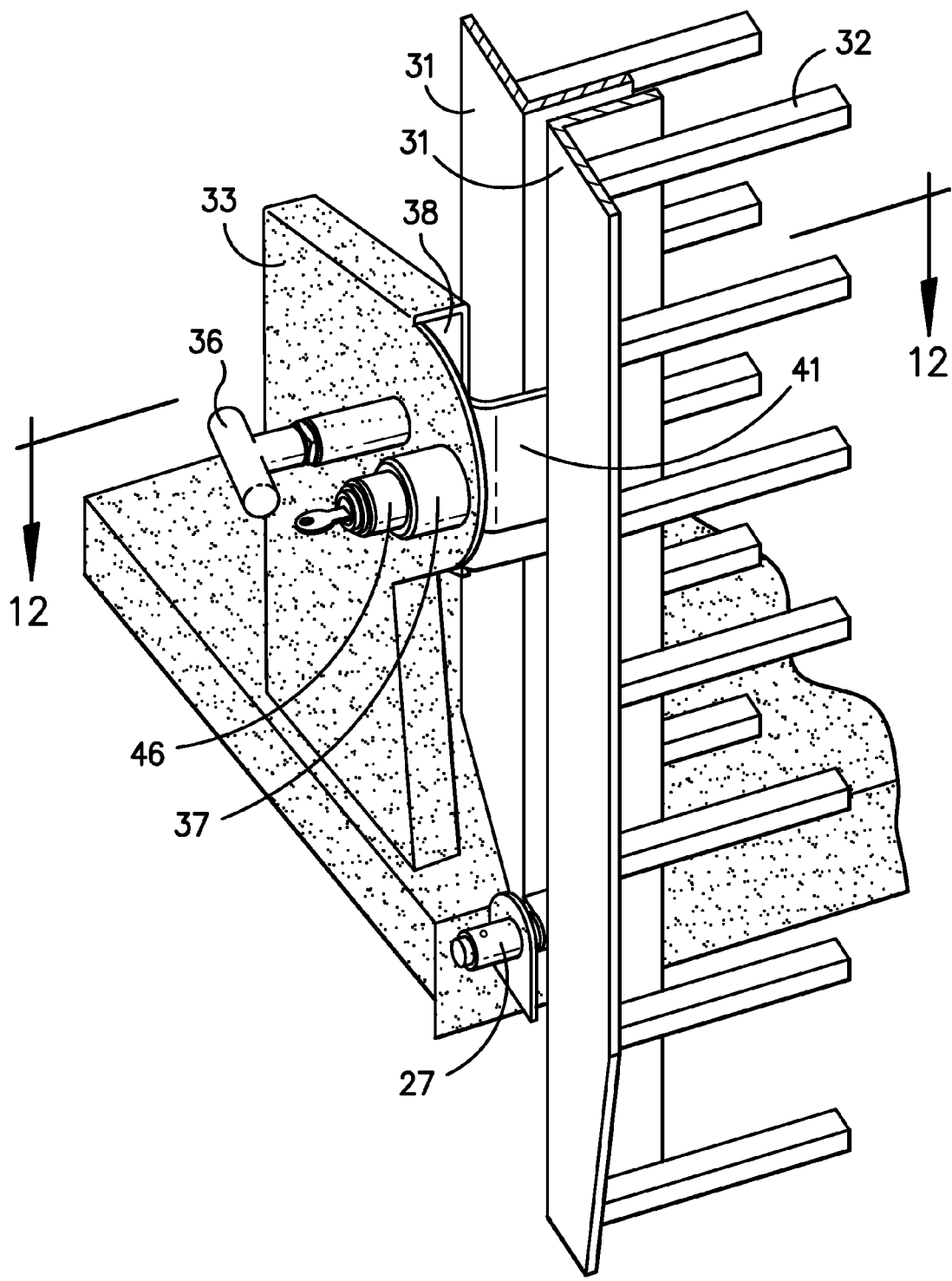
FIG. -11-

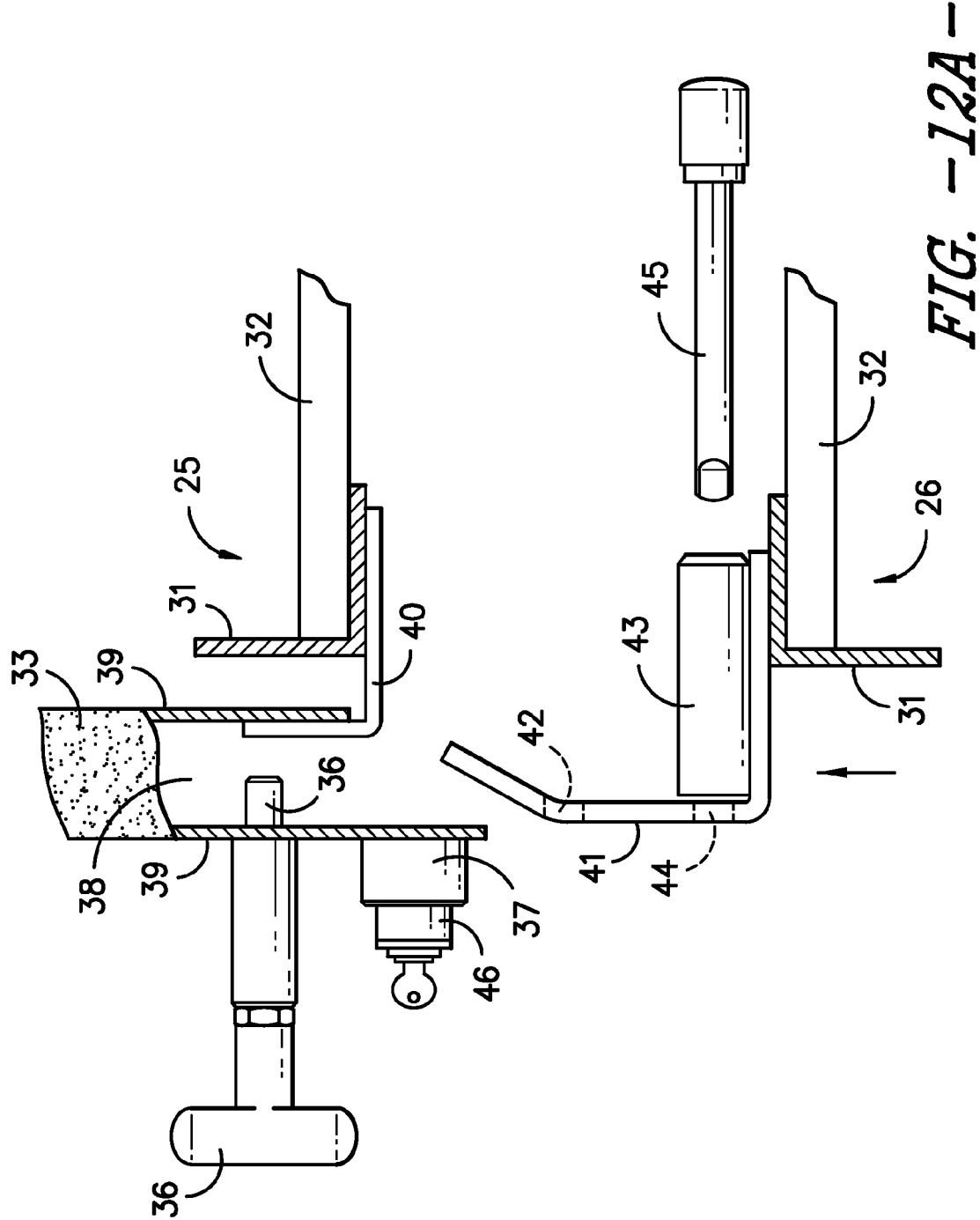

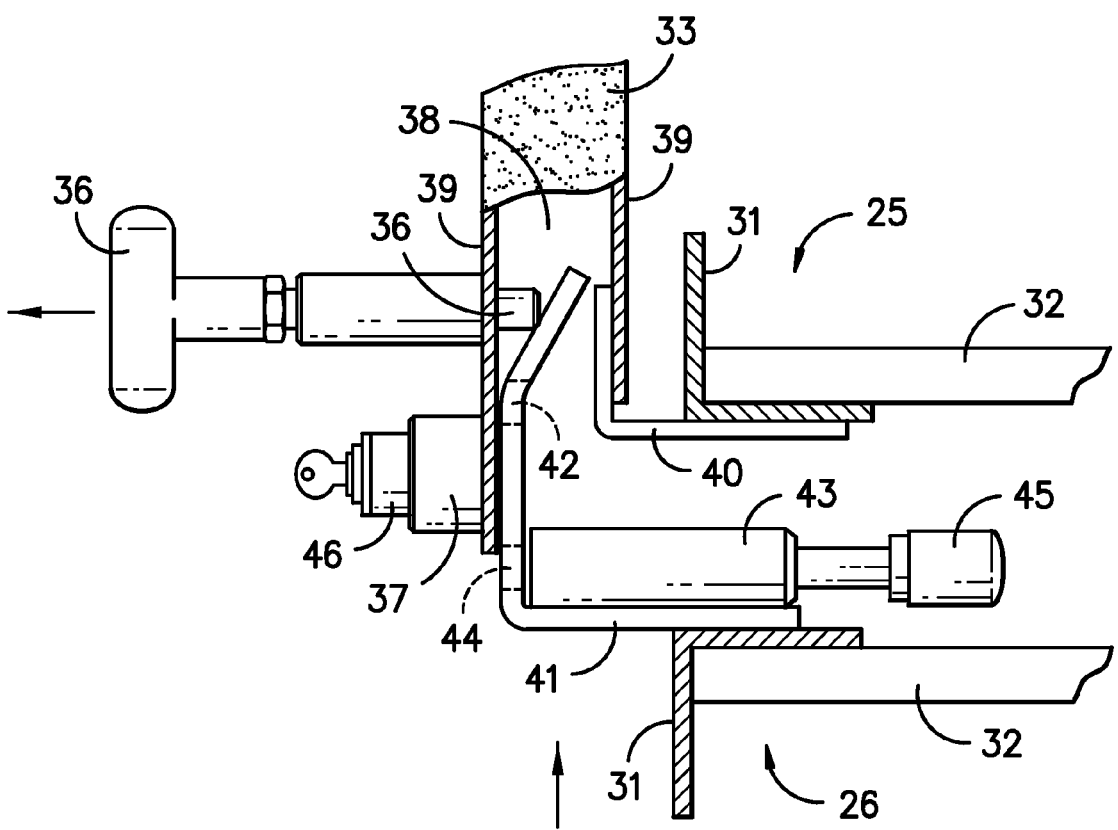
FIG. -12B-

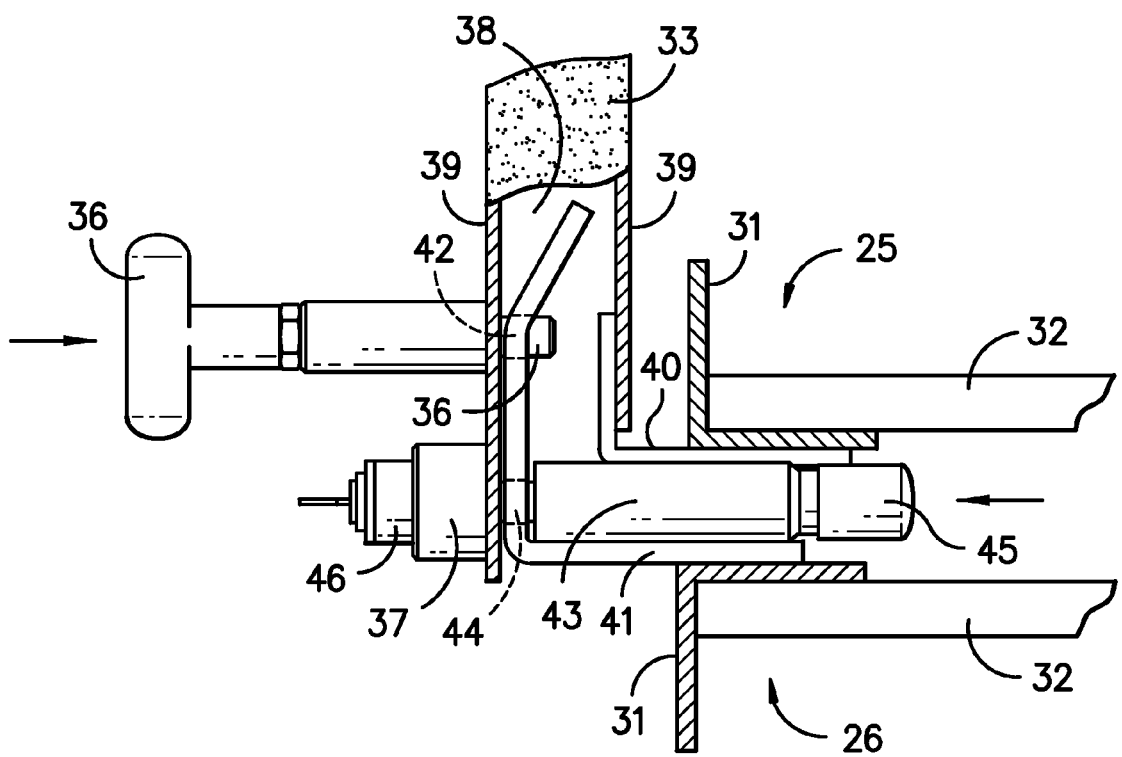
FIG. -12C-

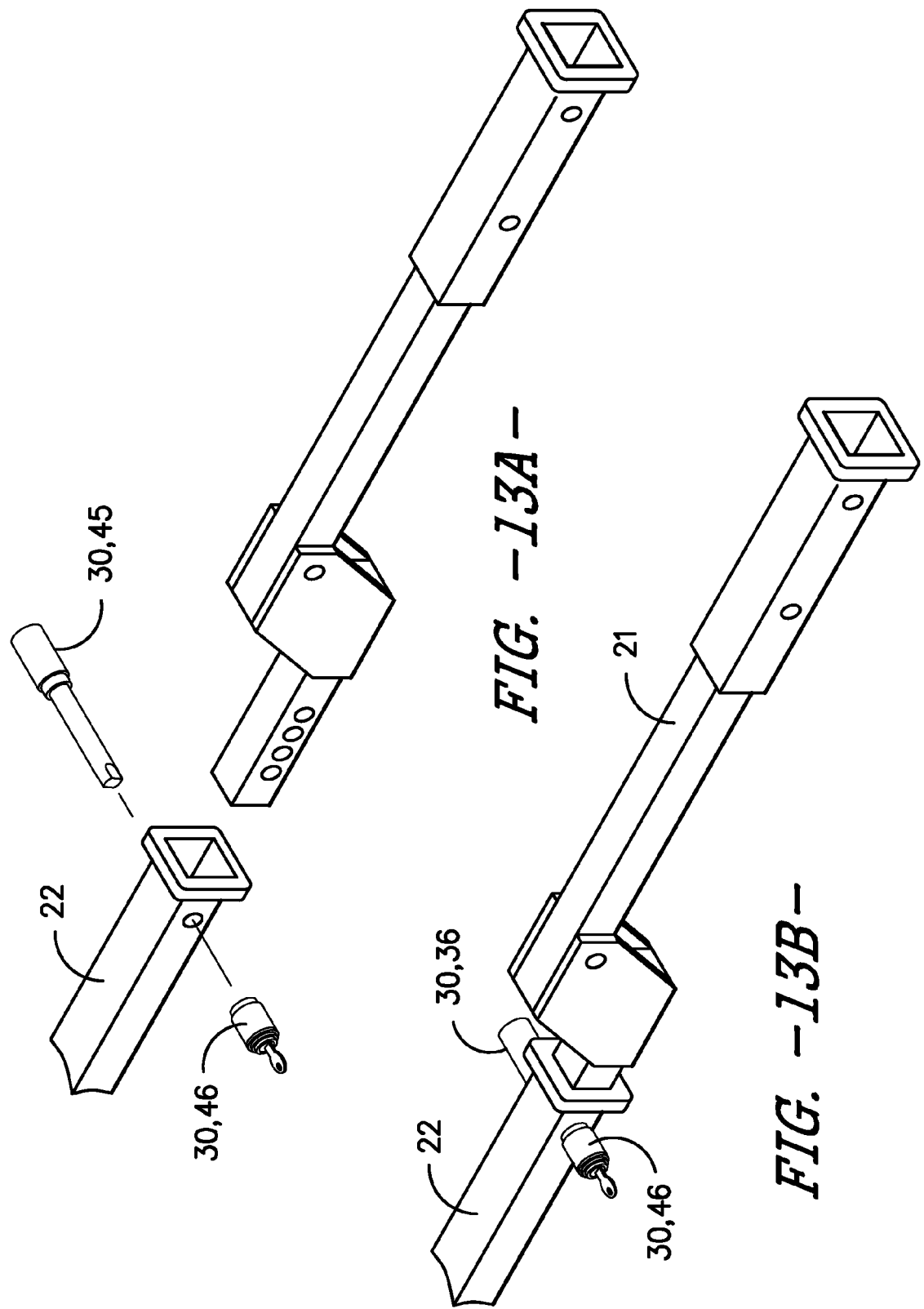

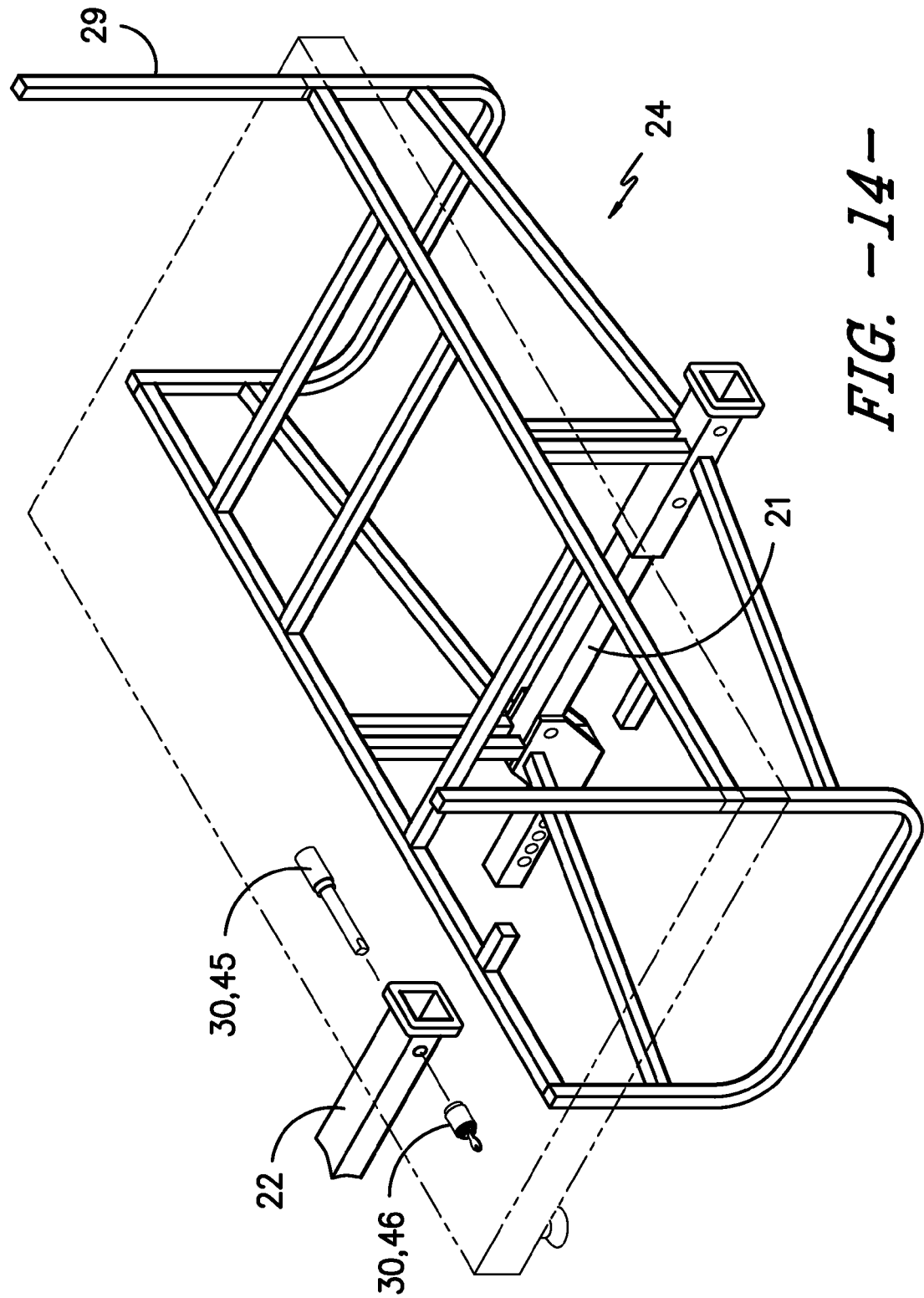
FIG. -14-

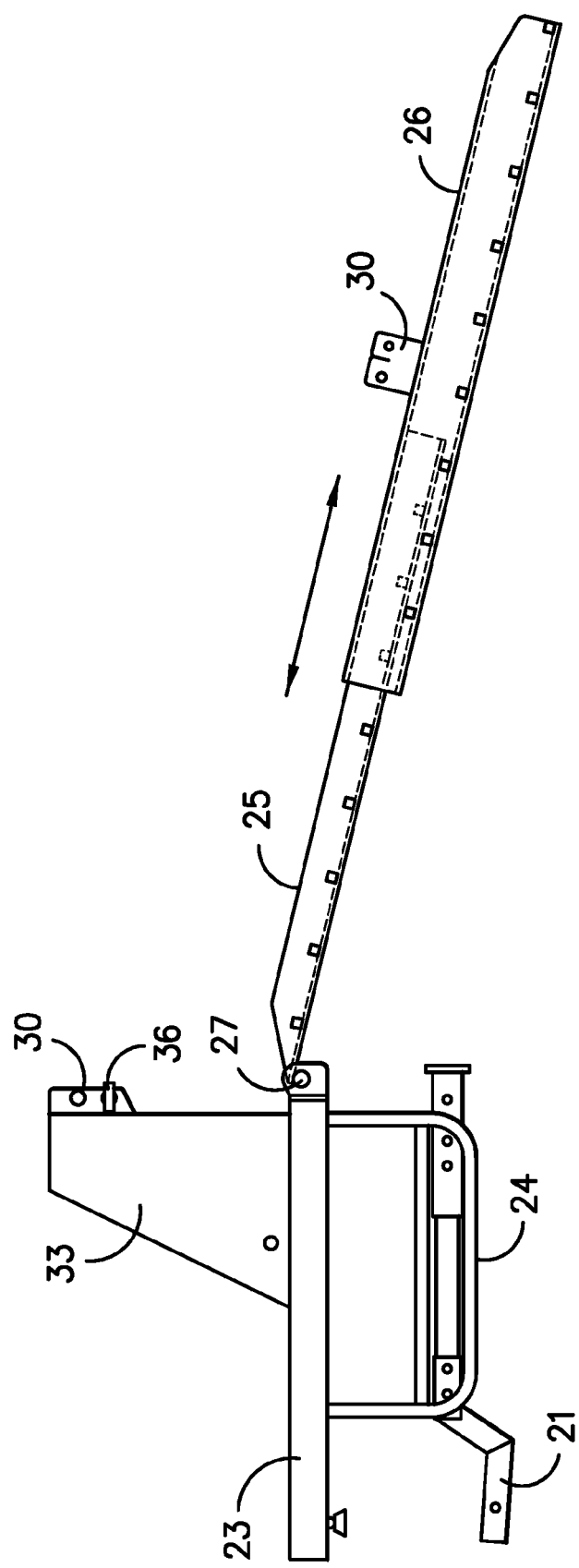
FIG. -15-

RECREATIONAL VEHICLE LOADING AND CARRYING APPARATUS

FIELD OF THE INVENTION

The present invention relates generally to an apparatus to assist in the loading and carrying of recreational vehicles. More particularly, the present application involves an apparatus designed to attach to a conventional pick-up truck to extend the bed of the truck and allow for safe and easy loading of a recreational vehicle into the extended bed.

BACKGROUND

With the popularity of recreational vehicles, including all-terrain vehicles and golf-carts, there is a challenge in safely, manageably, and cost-effectively transporting them from one location to another. These recreational vehicles are increasingly used for transportation around job sites, as utility vehicles around farms, as well as by hunters.

One method for transporting recreational vehicles includes loading it and carrying it on a utility trailer towed behind a pick-up truck or other motor vehicle. This method has drawbacks in loss of maneuverability on narrow dirt roads, necessity of a larger storage area when not in use, and poor security from theft, just to name a few.

Another method has developed in the art, which includes loading and carrying the recreational vehicle in the bed of the pick-up truck itself. This method has its own drawbacks, which include lack of enough room in a pick-up truck vehicle bed for larger recreational vehicles, as many pick-up truck vehicle beds have decreased usable space due to installed toolboxes and other accessories. This lack of usable room often results in there being insufficient space for a recreational vehicle, or unsafe transportation where a portion of the recreational vehicle hangs over the pick-up truck tailgate.

Another challenge of this method has been in loading the recreational vehicle into the pick-up truck, which often involves some form of ramp system. Often ad hoc ramps are used, which can be unstable and unsupported and pose an increased risk of injury or damage.

It is known generally to provide mechanisms that enhance the usable space of a pick-up truck vehicle bed to allow for storage and transportation of recreational vehicles, and it is also generally known to provide mechanisms that incorporate and attach ramp and storage structures to pick-up trucks that allow recreational vehicles to be loaded into and transported by pick-up trucks. Several of these transporting mechanisms are described in U.S. Patents and U.S. Patent Publications incorporated herein by reference, such as U.S. Pat. Nos. 6,769,583; 5,816,638, and U.S. Patent Publication No. 2002/0172584. However, many of these mechanisms and methods also have serious drawbacks, including problems in safety, security, ease of use and manufacture, weight, and affordability. As such, there remains room for variation and improvement within the art.

SUMMARY

Various features and advantages of the invention will be set forth in part in the following description, or may be obvious from the description, or may be learned from practice of the invention.

In accordance with one embodiment of the present invention, an apparatus is provided to extend the bed of a conventional pick-up truck vehicle having a trailer hitch receiver and to assist in the loading and carrying of recreational vehicles in such conventional pick-up truck vehicles. The apparatus includes a trailer hitch engaging member that is attached to a platform member configured to have substantially the same width as the pick-up truck vehicle bed and configured to lie in substantially the same plane as the pick-up truck vehicle bed. Attached to the platform member is a ramp that allows for the loading and unloading of a recreational vehicle.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

These and other features, aspects, and advantages of the present invention will become better understood with regard to the following description, appended claims, and accompanying drawings where:

FIG. 1 is a perspective view of one embodiment of the apparatus showing its loading and unloading position.

FIG. 2 is a side view of one embodiment of the apparatus showing its locked position for transporting or storage.

FIG. 3 is a side view of one embodiment of the apparatus with its ramp unfolded in mid-position.

FIG. 4 is a side view of one embodiment of the apparatus showing its loading and unloading position.

FIG. 5 is a scaled up side view of one embodiment of the apparatus showing its locked position for transporting and storage.

FIG. 6 is a perspective view of an alternative embodiment of the apparatus showing a different arrangement of side rails.

FIG. 7 is a side view of an alternative embodiment of the apparatus showing its locked position for transporting and storage.

FIG. 8 is a side view of an alternative embodiment of the apparatus with its ramp unfolded in mid-position.

FIG. 9 is a side view of an alternative embodiment of the apparatus showing its loading and unloading position.

FIG. 10 is a side view of one embodiment of the longitudinal support members.

FIG. 11 is a perspective view of a preferred embodiment of a locking mechanism for a ramp member illustrating a ramp member folded and locked in place.

FIG. 12A is a cross-sectional top view of a preferred embodiment of a locking mechanism for a ramp member illustrating a ramp member in a partially open and unlocked position.

FIG. 12B is a cross-sectional top view of a preferred embodiment of a locking mechanism for a ramp member illustrating a ramp member in a partially closed and unlocked position.

FIG. 12C is a cross-sectional top view of a preferred embodiment of a locking mechanism for a ramp member illustrating a ramp member in a fully closed and locked position.

FIG. 13A is an exploded view of a preferred embodiment of a locking mechanism for a trailer hitch engaging member and receiver.

FIG. 13B is a perspective view of a preferred embodiment of a locking mechanism for a trailer hitch engaging member and receiver.

FIG. 14 is a perspective view of a preferred embodiment of a trailer hitch engaging member operatively connected to a platform support member, illustrating an arrangement for locking the platform member to a trailer hitch receiver.

FIG. 15 is a side view of one embodiment of the apparatus with the ramp in the loading and unloading position.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

An exemplary embodiment of the apparatus 20 is shown in FIG. 1. The present disclosure is directed towards a stable and reliable apparatus 20 designed to extend the storage area of a conventional pick-up truck vehicle bed 35 in a pick-up truck having a trailer hitch receiver 22 and to facilitate easy loading, transport, and unloading of a recreational vehicle into the bed. The apparatus 20 may be employed to transport all-terrain vehicles and golf carts, although it is to be understood that the apparatus 20 can be used in a variety of applications.

The apparatus 20 includes a trailer hitch engaging member 21 that partially inserts into the trailer hitch receiver 22 and extends from the trailer hitch receiver 22. In one embodiment, the trailer hitch engaging member 21 is comprised of 2" square steel tube, can be straight or can be angled, and can be securely inserted into and removably fastened to the trailer hitch receiver 22. It is to be understood that although 2" square steel tube is described in this embodiment, any suitable size and type of material may be used.

Attached to the trailer hitch engaging member 21 is a platform member 23, such platform member 23 having a front edge 230, a rear edge 231, and at least to two side edges 232. The platform member 23 preferably has substantially the same width as the pick-up truck vehicle bed 35, and is positioned such that the front edge 230 is in communication with the rear edge of the pick-up truck vehicle bed 35 and such that the platform member 23 is in substantially the same plane as the floor of pick-up truck vehicle bed 35.

In one embodiment, the trailer hitch engaging member 21 is preferably attached to the platform member 23 by a platform support member 24. In accordance with one exemplary embodiment the platform support member 24 may take the form of aluminum framework of 1" square tubing welded into cage of approximately 59" wide×36" deep×14" deep, supporting the platform member 23 in the form of rectangular diamond tread plate. Although the platform support member 24 is described has having a cage in these dimensions and with these properties, and although the platform member 23 is described as a rectangular diamond tread plate, these structures may be variously shaped in accordance with other exemplary embodiments. Additionally, although the framework is described as being aluminum, any suitable material may be used Attached to the rear edge 231 of the platform member 23 is at least one ramp member 25, 26. In a further refinement, more than one ramp member 25, 26 can be used, and the ramp members 25, 26 can include an upper ramp 25 and a lower ramp 26 attached to each other by a hinge 27, in telescoping relation, or in any other suitable manner. In a preferred embodiment, the apparatus 20 includes two bi-fold ramps 25, 26, each bi-fold ramp 25, 26 measuring approximately 4' tall and 16" wide when folded and closed, and measuring approximately 8' long×16'wide when open and unfolded. It should be understood that any number and dimension of ramp members may be employed in various versions of the apparatus.

In an additional refinement, the hinge 27 includes a stop to maintain substantially an 11 degree angle, which provides a slight arch and increases the ground clearance for the recreational vehicle during loading and unloading. In one preferred embodiment, the ramp angle may be disposed in the range of about 8 degrees to about 14 degrees. The upper ramp 25 and lower ramp 26 can be configured to fold and unfold to allow easy and secure loading of a recreational vehicle, with each ramp configured to unfold independently and to accommodate uneven ground with ease.

In an additional refinement, side rails 29 can be attached to the platform member 23 and can have the same height as the sides of the pick-up truck vehicle bed 35, and the side rails 29 and ramp members 25, 26 can include locking mechanisms 30 to keep the ramp members 25, 26 in a folded and locked position during transit and storage. In one embodiment, the ramps 25, 26 may each include a pair of longitudinal support members 31 connected by a series of evenly spaced transverse support members 32. Any number of side rails 29 or locking mechanisms 30 may be employed in various versions of the apparatus 20, and it is to be understood that side rails and locking mechanisms are optional in accordance with other exemplary embodiments. For example, in one embodiment illustrated by FIGS. 1 and 5, the side rails 29 may be arranged in such a manner as to form an extension of the truck bed, more or less forming an enclosed trailer.

In yet another embodiment, as illustrated by FIGS. 6 and 7, a side plate 33 or panel may enclose only a portion of the trailer, leaving an open area for one to easily step into the trailer. The side rails of the platform support member 24 may be designed to allow a person to use the rails beneath the trailer as a step for stepping up into the trailer through the open space provided adjacent the truck bed 35 and the side plate 33.

In one embodiment, the locking mechanisms 30 and can include hardened locking pins, a keyed lock, a latch plate, a spring loaded pin, or other similar structures. For example, FIG. 11 shows a preferred embodiment of a locking mechanism 30 comprising a double locking system for both holding the ramps 25, 26 in a secured position and also for locking the ramps 25, 26 in a folded, closed position with a key. In this embodiment, a side rail 29 or panel 33 of the platform member 23 may include a push pull pop pin 36 (illustrated in FIGS. 11-12C by the T-handled pin) for holding and securing the ramps 25, 26 in a closed, folded position, and a guard 37 for receiving a key lock portion 46 of a bolt action lock 45, 46 for locking the ramps 25, 26 and only allowing access with a key. It is contemplated that the ramps 25, 26 are first engaged by the pop pin 36 with a pin 36 that holds both ramps 25, 26 in place, and the ramps 25, 26 may be further locked in place through the use of the bolt action key lock 45, 46.

FIGS. 12A-12C illustrate cross-sectional top views of cutting plane line 12-12 from FIG. 11. Describing in further detail, a preferred locking mechanism 30 may include a housing 38 present on the side of the platform member 23 comprising a pair of parallel locking plates 39 defining a slot 38 therebetween for receiving a portion of a longitudinal support member 31 of a ramp 25, 26. When the ramp 25, 26 is in the storage and transport position, a latch plate 40 that is attached to the longitudinal support 31 of the ramp 25, 26 may be disposed within the slot 38 of the locking mechanism housing 38. The lower ramp 26 preferably includes an angled member 41 welded to a longitudinal support member 31 of the ramp 26, the angled member 41 having a preferred dimension of ¼" thick×3" tall×4" wide. This angled member 41 defines a hole 42 (preferably ½") that engages the pop pin 36 present on the side panel 33 of the trailer 20, and a locking pin 36 may extend therethrough for securement purposes (as shown in FIGS. 12B and 12C). The locking pin 36 may be removed to allow the ramp 25, 26 to fold downwardly into the loading and unloading position.

The locking mechanism 30 may include a key lock assembly 45, 46 for further securing of the apparatus and to prevent unwanted removal of a loaded recreational vehicle. The angled member 41 may further include a tube or pipe 43 (dimensioned in one embodiment to be approximately 3 inches long with 1⅝ inch inner diameter and 1¼ inch outer diameter) attached to the angled member 41 through welding or another suitable method. A first rod or bolt portion 45 of the lock bolt may insert through this pipe 43, extend through a hole 44 aligned on the angled plate 41, and lock in place with a second corresponding key lock portion 46 of the lock bolt inserted through a guard 37 (dimensioned in one embodiment to be 1¼ inch long, 1⅛ inch inner diameter and 1⅝ outer diameter) welded to the side rail 29 or panel 33 of the platform member 23. This second corresponding key lock portion 46 of the lock bolt requires a key for unlocking and removing the bolt so that the ramps may be unfolded.

In one embodiment, both the left and right side of the platform member include this double locking system comprising a push pull pop pin 36 and a bolt-action key lock 45, 46 so that each ramp member may be fully locked for security and safety. It is also preferred to include a bolt action key lock 45, 46 on the trailer hitch 21, 22 to secure and lock the trailer hitch engaging member 21 in place, as shown in FIGS. 13A and 13B. It is contemplated that the same key may be used to unlock all key locks associated with the same loading apparatus.

In a further embodiment, the platform member 23 can contain tie down loops 47 made of steel, or another suitable material, to secure the recreational vehicle with straps or chains. Through these further refinements, the apparatus 20 is configured to allow the user to substantially secure the recreational vehicle in transit and also discourage theft.

Further refinements and embodiments can include addition of lights 48 to the apparatus 20 that can be wired with the pick-up truck vehicle, allowing for brake, signal, and running lights on the apparatus 20. Additional embodiments can include configuring the extended end of the trailer hitch engaging member 21 so that it can receive trailer hitches and the addition of a lighting plug to extend lighting connections for a trailer.

The apparatus may be made out of a variety of materials in accordance with various exemplary embodiments. In one embodiment, the apparatus is constructed from aluminum, which is suitable for this purpose and is beneficial because it is lightweight, sturdy, easy to clean, and is safe for use. In a preferred embodiment, the apparatus has a weight of 180 pounds or less, in order to facilitate attachment and removal of the apparatus with respect to the vehicle, although it is contemplated that the apparatus may be heavier for certain applications and uses.

In the above embodiments, it is contemplated that the tailgate of a pickup truck has been removed from the truck, so that the tailgate does not interfere with the operation of the loading and carrying apparatus. However, it is also contemplated that one embodiment of the loading and carrying apparatus may be formed in such a way that the tailgate of the truck may remain attached to the truck while the apparatus is in use. In this embodiment, the platform is disposed slightly below the plane of the truck bed, allowing the tailgate to open and lay flat on top of the platform.

It is also contemplated that a cart, designed specifically for use with the present invention, can be used to roll or transport the trailer apparatus to a specific location or vehicle for attachment to the vehicle truck bed. The cart preferably includes a height adjusting mechanism, such as a hand crank or hydraulic mechanism, which allows for the trailer to be lifted or lowered to the desired height for attachment to a vehicle. Once the trailer is attached to the hitch of a vehicle, the cart may be rolled away.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What i claimed is:

1. An apparatus for extending the storage area of a conventional pick-up truck vehicle bed in a pick-up truck having a trailer hitch receiver, comprising:
   a trailer hitch engaging member that removably engages the trailer hitch receiver and extends from said trailer hitch receiver;
   a platform member attached to said trailer hitch engaging member, said platform member having a front edge, a rear edge, and at least to two side edges, having substantially the same width as the pick-up truck vehicle bed, and positioned such that said front edge is in communication with the tail edge of the pick-up truck vehicle bed and such that said platform member is in substantially the same plane as the floor of the pick-up truck vehicle bed;
   at least one ramp member attached to said rear edge of said platform member;
   a double locking system on said ramp member for securing said ramp member in a folded and locked position during transit and storage;
   whereby said double locking system includes a pair of parallel locking plates defining a slot therebetween for receiving a section of said ramp member, such that said ramp member may be folded upwardly and secured within said slot of said double locking system and a pop pin operatively connected to an outer side of said parallel locking plate and extending therethrough for securing said section of said ramp member within said slot;

whereby said double locking system further includes a key lock assembly comprising;

a key lock portion operatively connected to an outer side of said parallel locking plate and extending therethrough, said key lock portion capable of receiving a bolt portion of said key lock assembly for securing said section of said ramp member within said slot; and an angled member affixed to said ramp member, said angled member defining a hole to engage said pop pin and further including a tube affixed to said angled mermber for receiving said bolt portion of said key lock assembly, such that when said ramp mermber is in a locked position, said bolt portion is inserted through said tube and engaged with said key lock portion, whereby a key can be used to lock said bolt portion into said key lock portion, thereby locking said ramp member in place.

2. The apparatus of claim 1, wherein said ramp member comprises an upper ramp attached to the rear edge of the platform member and a lower ramp attached to a distal end of the upper ramp.

3. The apparatus of claim 2, wherein said upper and said lower ramp are attached to one another using a hinge means such that the upper and lower ramp are configured to fold and unfold with respect to one another.

4. The apparatus of claim 2, wherein said upper and said lower ramp are slidably attached in telescopic relation to each other.

5. The apparatus of claim 1, wherein said ramp member is attached to the rear edge of the platform member using a hinge means such that the ramp member may fold upwardly for storage and transportation and unfold downwardly for loading and unloading.

6. The apparatus of claim 1, wherein said ramp member is comprised of a pair of longitudinal support members connected by a series of generally evenly spaced apart transverse support members.

7. The apparatus of claim 1, wherein said platform member further includes at least one longitudinal side rail attached to an upper portion of the side edge of the platform member and disposed in parallel relation with the side edge at generally the same height as the sides of the vehicle bed, forming an extension of the vehicle bed.

8. The apparatus of claim 1, wherein said platform member further includes at least one side plate disposed vertically and in communication with the side edge of the platform member, said side plate being dimensioned such that the platform member is partially enclosed, thereby allowing access to the platform member from a side edge of the platform member.

9. The apparatus of claim 1, wherein said apparatus weighs 180 pounds or less.

10. The apparatus of claim 1, wherein a locking mechanism locks said hitch engaging member into said hitch receiving member.

* * * * *